United States Patent
Urbanic et al.

[11] 3,735,084
[45] May 22, 1973

[54] METHOD OF CONTROLLING THE QUALITY OF SEAM WELDED PRODUCT

[75] Inventors: John M. Urbanic, Pittsburgh; D. Marshall Fox; Frederick C. Panian, both of Lower Burrel, all of Pa.

[73] Assignee: Aluminum Company of America, Pittsburgh, Pa.

[22] Filed: May 11, 1972

[21] Appl. No.: 252,306

Related U.S. Application Data

[63] Continuation-in-part of Ser. No. 77,411, Oct. 20, 1970, abandoned.

[52] U.S. Cl. ....................219/67, 219/8.5, 219/110
[51] Int. Cl. .............................................B23k 31/06
[58] Field of Search....................219/8.5, 9.5, 10.53, 219/59, 67, 110

[56] References Cited

UNITED STATES PATENTS

| | | | |
|---|---|---|---|
| 3,573,416 | 4/1971 | Drechsler | 219/8.5 |
| 2,309,343 | 1/1943 | Farrow | 219/59 |
| 2,933,582 | 4/1960 | Tower | 219/8.5 |
| 2,744,182 | 5/1956 | Gross | 219/110 |
| 2,582,963 | 1/1952 | Cachat | 219/8.5 X |

*Primary Examiner*—J. V. Truhe
*Assistant Examiner*—L. A. Schutzman
*Attorney*—Elroy Strickland

[57] ABSTRACT

A method of controlling the quality of a product having a weld seam extending longitudinally thereof, the seam being progressively produced by a welding arc generated across adjacent edges of product stock as the stock travels past a welding station, and as the edges are forced together at a location downstream from the welding station. The method includes the steps of continuously measuring a plurality of critical welding parameters as the seam is being formed, and identifying for rejection the lengths of the product welded when any one or group of the welding parameters deviate from limits predetermined for the parameters. By this method confidence levels of 99.95 percent, soundly welded product are obtained.

3 Claims, 5 Drawing Figures

PATENTED MAY 22 1973

METHOD OF CONTROLLING THE QUALITY OF SEAM WELDED PRODUCT

This application is a continuation-in-part of application Ser. No. 77,411, filed Oct. 20, 1970 now abandoned.

BACKGROUND OF THE INVENTION

The present invention relates generally to a method of closely controlling the quality of a completed welded product having a weld seam, and particularly to controlling the quality of a welded tube product especially suitable for fluid and hydraulic uses though the invention is not limited thereto.

As is well known in the art of forming a weld seam in an elongated product, there are a number of welding factors and conditions that directly affect the quality of the weld seam. For example, in forming a welded tubular product from a relatively narrow strip of metal stock, the condition of the edges of stock are particularly critical. Before the stock is welded, the strip travels longitudinally through curve forming rollers which curve the strip until its edges are placed in confronting position with each other. At a predetermined location along its path of travel and before the edges of the strip are urged and forged together in abutting relation to form the seam, the edges are heated to a welding temperature by high frequency energy coupled thereto by induction electrodes or an induction coil located adjacent the path of travel of the strip. As can be appreciated, if the edges of stock are not in essentially the same plane, or if the edges are rough or gouged, or if the width of the strip is under or oversize, the quality of the weld seam will be directly adversely affected.

Other welding conditions that directly affect the quality of a weld seam include the welding energy input per unit length of metal, i.e., the speed of linear travel of the metal, the general level of welding power, and the condition of the above-mentioned forming rolls as well as the condition of squeeze rolls employed in the forging process as explained in detail hereinafter.

In welding a tubular product for use as a conductor of fluids, and particularly as a conductor of fluids under pressure, the quality of the weld seam is particularly important since any defects therein can result in leakage and loss of the fluid. In welding such a product for a heat exchange unit, such as an automobile vehicle radiator, where the number of tubes is approximately 60 involving a total length of tubing on the order of 120 feet, a single defect in one portion of the seam of one tube can result in the complete disability of the radiator as a cooling unit.

The criticality of the same weld in such tubes is further accentuated by the fact that the tubes are very small in diameter, i.e., on the order of one-quarter to one-half of an inch, and the thickness dimension of the metal of such tubes is extremely thin, i.e., in the range of 0.010 to 0.016 of an inch. As can be appreciated, the aligning of the edges of such a thin and small diameter stock for the welding process is critical, and the criticality is compounded in a high speed production process.

Many devices and schemes have been tried to increase the quality of a weld seam but these have been limited essentially to improvements related directly to the welding process involving the unfinished product, i.e., improvements related to techniques in the direct and automatic control of welding conditions, for example, automatic control of welding power or the speed of the traveling stock in response to a measured condition, such as the temperature of the stock edges being welded. In such processes, attention is directed to optimizing the weld condition or conditions while attention to the control of the quality of the finished product is lacking. In this manner, defective product is often produced in large amounts before the condition causing the defective product is discovered. Further, the defective product is usually wholly mixed with the satisfactory product. When the defective product, or the condition causing it, is discovered, the welding operation is stopped until the condition at fault can be corrected, and the finished product produced under such conditions must be inspected in order to segregate the good from the bad, which adds a substantial cost factor to the finished product, or the entire lot must be discarded. In both instances, the scrap generated is substantial and uneconomical.

Thus, the prior methods of relying on the control of welding conditions as a means to control the ultimate quality of a weld seam have left much to be desired in the way of quality assurance and confidence in the finished product as well as the cost and scrap factors involved.

BRIEF SUMMARY OF THE INVENTION

The present invention is directed to a method of ascertaining and thereby controlling and assuring the quality of a completed welded product having a longitudinally extending weld seam without relying per se on the successful operation of the welding process and the individual control of a welding condition or conditions. This is accomplished by continuously monitoring certain, critical weld parameters that have been first empirically determined to consistently produce a weld seam of a predetermined high quality, and identifying lengths of the welded product for rejection purposes when any one or group of the monitored parameters deviate beyond limits predetermined therefor. In this manner, the percentage of the product having a weld seam of the predetermined high quality is 99.95 percent since any portion of the product welded during a parameter deviations is suspect and thus identified for rejection. Further, this confidence level is obtained with product stock having a thickness in the range of 0.010 to 0.016 of an inch, and above, in practicing the method of the present invention.

The welding parameters monitored include the pressures at which at least three squeeze rolls force the edges of product stock together after being heated to a welding temperature by a welding arc, the speed of linear travel of the stock, the measure of eddy currents induced in the product after the welding operation, and at least three electrical parameters in a power source providing the electrical power requirements of the welding arc.

As explained in detail hereinafter, to further insure a high quality welded product, the longitudinal position of the welding arc, as well as the intensity of the light energy thereof, can be continuously measured, and the flow rate of a coolant employed to maintain the temperature of a magnetic impeder element at an optimum level is continuously closely controlled.

THE DRAWINGS

The invention, along with its advantages and objec-

PREFERRED EMBODIMENT

Figure 1:
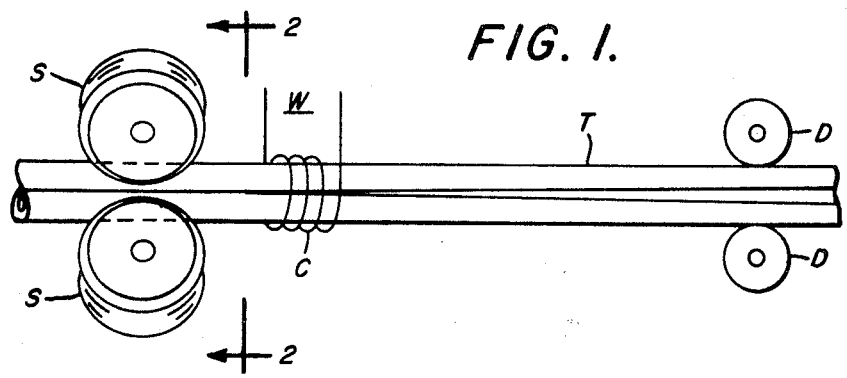
FIG. 1 is an elevation view of tubular product being formed in a tube forming and welding mill.
Figure 2:
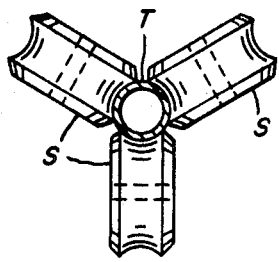
FIG. 2 is a cross sectional view taken along lines 2—2 of FIG. 1.

In practicing the method of the present invention, the original stock from which a final product is formed and in which a weld seam is made is first threaded through a mill (and thereafter continuously translated therethrough) designed to weld and otherwise form the product in its final product configuration. Many mills are commercially available for producing welded tube, and are generally equipped with roller dies D (FIG. 1) which are adapted to receive a relatively narrow strip of stock metal (from a coil of the stock) and continuously form the strip into a tubular structure T of desired cross sectional configuration for the seam welding process as the stock (and tube) is pulled through the mill by a caterpuller device located near the exit end of the mill. The tube forming roller dies D locate the opposed edges of the strip in substantially the same horizontal plane so that they can be urged together in an abutting relationship (FIG. 2) by squeeze rolls S after being heated to a welding temperature by an arc at a welding station W, the welding station being located between the roller dies and the squeeze rolls. If three squeeze rolls are employed, as shown in FIG. 2, they are usually angularly disposed about the tube at about 120° apart so as to exert a substantially uniform pressure on the tube in the process of urging the heated edges together.

At the welding station W is located an induction coil C through which the tube stock T passes on its way to the squeeze rolls, the coil being supplied with radio frequency energy from welding apparatus (not shown) providing the energy. The coil, as an integral part of the welding apparatus, induces this energy in the tube stock and thereby generates the welding arc.

The welding apparatus is capable of generating radio frequency energy sufficient to product the welding arc across the opposed edges of the tube stock as the stock moves through the coil. The welding apparatus includes electronic circuitry which produces a high frequency welding current on the order of 450 kilocycles, for example, the circuitry including rectifier tubes or solid state rectifiers and a power oscillator tube or tubes and circuits developing the high frequency energy. From the oscillator tubes and circuits, the energy is applied to the welding coil through a power coupling transformer.

The welding apparatus includes further a magnetic flux concentrating element, usually known as an impeder, located and centered within the tube and in the high frequency field of the welding coil. The impeder, which is a small ferromagnetic member, functions to concentrate the high frequency welding current at the edges of traveling tube by impeding current flow around the periphery of the tube. Since the impeder is made of a ferromagnetic material, it is subject to inductive heating by the welding coil as a result of hysteresic effect, and therefore is usually cooled by a flow of water coolant directed thereover.

The reluctance of the impeder is directly dependent upon its temperature. Therefore, a change in its operating temperature directly affects the coupling efficiency of the welding coil. In this manner, the temperature of the impeder becomes another critical factor in the soundness and consistency of the weld seam being formed, and in accordance with an embodiment of the invention, its temperature is closely controlled as explained in detail hereinafter.

In sending the strip stock of metal into a mill, the mill described above, for example, the width and edges of the stock are critical factors in obtaining a sound, consistent weld seam. In order to insure a consistent, standard width for a predetermined size diameter tube, and to reduce the possibility of nicked or gouged edges from entering the weld zone, the strip is preferably directed through an edge trimming device which removes a portion of metal on each edge of the strip as it is pulled into the mill.

With a standard width and even edges of the metal strip provided by the edge trimming device, there may remain nicks and gouges that are deeper than the width dimension required for a tube of the predetermined diameter and produced by the trimming device. Coupled with this possibility are all the other conditions discussed earlier which can adversely affect the quality of the weld seam formed in the mill.

In accordance with the present invention, the quality of a seam welded product is controlled by identifying and rejecting that portion of the product welded during the time in which any one or groups of a plurality of measured parameters representing a like number of welding conditions deviate from predetermined limits, the parameters representing ideal conditions, i.e., conditions that have demonstrated the production of a sound, consistent weld seam.

Preferably, the parameters that are measured and which form the basis for rejection purposes, are the grid current of the oscillator tube or tubes in the power source supplying the radio frequency power requirements of the welding arc, the voltage and current of the rectifiers in the power source, the three pressures exerted by the three squeeze rolls S in forcing the edges of tube stock together, the speed of linear travel of the tube stock and eddy currents induced in the welded tube as a measurement of the quality and continuity of the weld seam. The voltage and current on the plates of the rectifier tubes in the welding apparatus, such as the welder described above, and the current in the grid circuits of the oscillator tubes therein, provide an accurate and direct indication of changes in electrical power being coupled to the edges of the traveling tube stock by the coil. As indicated in the form of block diagrams in FIG. 3 of the drawing, the welder has instrumentation including current and voltage measuring meters 1, 2 and 3 for reading the above three electrical parameters and for producing readout signals for expanded scale instrumentation generally designated by numeral 4 in FIG. 3.

As normally designed, the high frequency power source of a welding device includes a plate voltage meter graduated to read from zero to 15,000 volts on about a 4 inch scale. With such metering devices, a variation as substantial as 400 volts is essentially impossible to accurately detect, and rapid excursions in excess of 1,000 volts can also occur undetected due to the inertia of the meters. Similarly dimensional meters are used for reading plate and grid currents, the ranges of which are again quite large.

As can be appreciated, the changes that are reflected in the power requirements of the welding coil as the result say of a mismatch of the edges of thin wall, are extremely small and very rapid (with the rate of travel of the stock which is on the order of 200 feet per minute) so that the above-described metering is substantially totally inadequate for measuring and monitoring these power changes and are thus inadequate for the purposes of the present invention.

Figure 3:
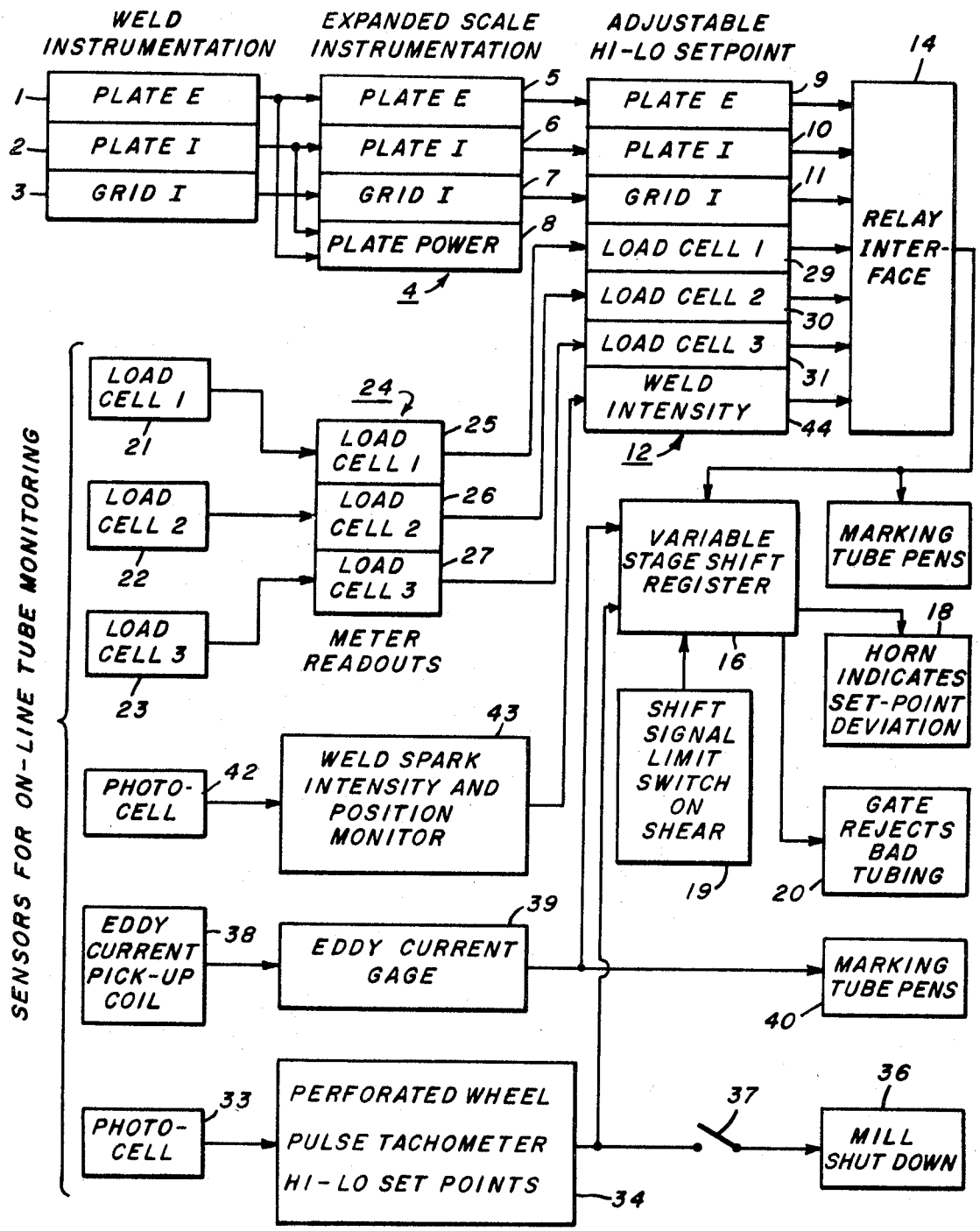
FIG. 3 is a block diagram showing the monitored functions employed and integrated in a method of controlling and assuring the quality of a seam welded product in accordance with principles of the present invention.

The expanded scale instrumentation 4 provides a means for expanding a discrete portion of voltage and current parameters being measured by the meters 1, 2 and 3, and monitoring this portion for minute variations. Such voltage and current expansions can be economically accomplished with solid state, operational amplifiers providing a voltage output in a predetermined, low voltage range. In FIG. 3, the expansion circuits for monitoring rectifier voltage and current, and for monitoring oscillator grid current, are labeled 5, 6 and 7, respectively. The plate voltage and current signals from the welder are further combined and expanded to provide a plate power reading as indicated by numeral 8. These circuits include further voltage and current meters providing a visual indication of the plate voltage and plate and grid currents being expanded, and these meters are located for ready observation by operating personnel.

The expansion circuits 5, 6 and 7, when receiving a signal input from the meters 1, 2 and 3, produce output voltages, the levels of which are monitored respectively by voltage level detecting means 9, 10 and 11. These may comprise meter relays or transistor voltage level detecting circuits. Each meter relay or voltage level detecting circuit is provided with a bias control for preselecting a high and a low voltage level at which each will operate to complete the circuit of a corresponding relay of a composite relay interface 14 presently to be explained. As shown in FIG. 3, the detecting means 9, 10 and 11 may be a part of an integrated arrangement 12 providing a number of detecting channels employed for detecting voltage levels of other welding parameters of the invention as explained hereinafter.

The output of the relay interface 14 is, in turn, connected to a variable stage shift register 16, as shown in FIG. 3, and to a mechanism 18 for marking the welded tubes with the occurrence of a signal from the relay interface. The marking mechanism may be any device, a relay solenoid for example, capable of momentarily moving a marking pen against the tube when a welding parameter deviates beyond predetermined limits.

The shift register 16 is a digital computer in which a plurality of circuit stages operate to follow or monitor the position of sections of tube length through the mill, and to follow lengths having a defective weld from the origin of the defect to a tube cutting or shearing mechanism. The number of stages required (and selected) for the "following" operation depends upon the actual length of the tube sections being cut by the shear. As a section of tube length moves through the mill, the register shifts the information forward through the stages to the last stage, the completion of the shifting process occurring when the section of tube length reaches the shear. When a section of tube welded during a welding parameter deviation beyond predetermined limits reaches the shear, the register operates to energize a movable gate means 20 which, when moved, diverts the defective tube length or lengths to a reject conveyor and bin. The shear mechanism operates continually to cut the welded tube in lengths of a predetermined length dimension.

As shown in FIG. 3, a limit switch 19 is electrically connected to the shift register 16. The switch is physically mounted to be operated by the shear. With each operation of the shear, and thus with each length of welded tube being sheared, the limit switch applies a signal to the shift register. It is this signal that shifts signals representative of predetermined tube lengths through the register 16 and which clears the register of a "bad" signal when the defective tube length is rejected.

In using deviations in electrical parameters providing the power requirements of the welding arc as the basis for rejecting welded tube, the level of welding power, i.e., the electrical parameters of rectifier voltage and current and oscillator grid current, is first selected on the basis of the alloy, gauge and temper of the stock to be welded, and then empirically determined to produce a sound, solid weld seam. This requires welding a certain amount of tube stock, and then testing its soundness having noted the parameters that produced the weld of the desired quality.

The plate voltage and the plate and grid currents that produced the desired weld are sensed and read by the meters 1, 2 and 3 on the welding apparatus, and a discrete portion of each parameter is expanded and read on the meters of the expansion circuits 5, 6 and 7 and explained earlier. The discrete portion of the welding current and voltage is that portion in which the ideal welding operation took place. Thus, if the welding voltage, as read on meter 1, was 11,500 volts, the corresponding expansion meter 5 would read 5 with a meter movement of zero to 10 covering 1,000 volts, with zero indicating 11,000 volts.

Once the ideal power level has been determined, any major deviation from this level can be expected to produce a weld product of questionable quality. Thus, after the readings on expansion meters 5, 6 and 7 are set as the ideal voltage and current levels for a desired weld quality, an arbitrary amount of deviation from these ideal readings is chosen by adjusting the level at which the voltage detecting means 9, 10 and 11 will operate to close circuits to the relay interface 14. For example, if it is determined that anything beyond a plus or minus 10 volts excursion on the plates of the rectifier tubes in the power supply of the welder would produce questionable tubing, the detecting circuit 9 is adjusted to operate when such a voltage excursion occurs. With a voltage of 11,500 volts on the plates, such an excursion is very small, i.e., less than one tenth of 1 percent of the plate voltage.

Assuming such a voltage excursion or deviation does take place, the detecting means 9 operates to close a circuit to a relay device in the relay interface 14. The relay device is thereby energized and directs a signal to the shift register 16, which as explained above, follows that portion of the product welded during the voltage excursion from the welding station to the location of the shearing mechanism. When the length of product having the weld formed during this voltage excursion is cut from the product (which is continuously moving through the mill), the shift register produces a signal which operates to move the gate 20 in the path of the cut section to divert the same from the cut sections of product that have been welded within the limits set for the ideal welding voltage.

The above sequence of operations would take place with predetermined excursions in plate and grid currents as well as the other welding parameters of the invention as presently to be explained.

As mentioned earlier, another welding parameter employed in the quality control method of the invention is the pressure at which the edges of the tube stock are urged and forged together after being heated to a welding temperature by the welding arc. In the present invention, this forging pressure is preferably measured by the use of three load cell transducers 21, 22 and 23 respectively associated with the three squeeze rolls S described earlier in connection with the tube mill. More particularly, each transducer is located between a structure supporting each of the squeeze rolls for rotation and a fixed reference surface. With the slightest change in pressure, the transducer (or transducers depending on which one or ones are affected) produces an output voltage (or voltages) that is directed to corresponding metering circuits in a circuit bank 24. The bank has thus three metering circuits, designated 25, 26 and 27, the metering circuits respectively monitoring the output of the transducers 21, 22 and 23.

A type of load cell or transducer suitable for the purposes of the invention is a balanced bridge type of device which provides an output voltage in the millivolt range when it undergoes a minute change of pressure. This output is amplified by the metering circuits of the circuit bank 24.

As can be appreciated, such transducers will be sensitive not only to pressure differentials caused by stock edges that are not properly aligned with respect to each other, but by a fault of the squeeze rolls, such as the accumulation of oxides thereon, or a faulted bearing. In this manner, all conditions adversely affecting forging pressure will be monitored for tube rejection purposes.

The output terminals of the meter devices and circuits 25, 26 and 27 are connected respectively to three voltage level detecting means 29, 30 and 31 forming a part of the integrated bank 12 providing the plurality of voltage level detecting channels explained above. These circuits, when energized by a voltage signal from the bank 24 function to complete a corresponding relay circuit in the interface 14 as explained above in connection with deviations in the power factors of the welding circuits.

As with the case of the electrical power parameters, the ideal forging pressure parameters, as monitored by the meter circuits of 24, are chosen empirically, and thereafter arbitrary pressure value deviations are chosen for the purpose of identifying product welded during the time of such deviations, by adjustment of the voltage level detecting channels 29, 30 and 31 for the meter circuits 25, 26 and 27. For example, if it is found that a pressure of 45 pounds on each of the load cells 25, 26 and 27 produces an ideal weld seam, and a 1 pound deviation above and below 45 pounds does not appreciably detract from the soundness of the weld seam, the upper and lower limits for the meter circuits of 24 are set for 46 and 44 pounds respectively. Any deviation of pressure on any of the three load cells beyond these limits operates to complete the relay circuit in the interface 14, the signal generated in response thereto functioning to energize the shift register 16. In the manner explained above in connection with the factor deviations of welding power, the shift register follows the section length or lengths of the product welded during the pressure deviation so that it or they can be diverted to a reject location by gate 20 after being cut by the shear.

In addition to the welding power and forging pressure parameters, the method of the present invention relies on the measurement of travel speed of the product being welded, and upon the measurement of eddy currents induced in the welded product.

The speed of the tube stock through the induction coil of the welding apparatus is very critical since any variation in speed varies the power input per increment of weld seam. It is essential, therefore, that any small variation in the actual linear speed of the product be detectable to obtain a consistent, high weld quality.

A speed measuring means particularly suitable for the purposes of the present invention is a phototachometer device, indicated generally in FIG. 3 by blocks 33 and 34. The device includes a low inertia perforated disc held in contact with the traveling product by an adjustable dead weight. The perforations in the disc generate a series of light pulses by interrupting a light beam directed upon a light energy detector such as a photocell. The indicated speed of the product is a function of the rate at which these pulses are generated and converted (by the light detector) to an electrical signal. In FIG. 3, 33 represents the light detector, and the perforated wheel is represented by the box 34 in combination with a circuit capable of counting and integrating the electrical pulses produced by the light detector to provide a voltage output as a measure of product speed. The speed measuring circuit includes further adjustable, voltage level detecting circuits, the output of which is connected to the shift register 16 and to a means 36 for automatically stopping the mill and the welding process when the speed of the tube deviates beyond limits preset on the adjustable voltage detectors.

The mill stopping means 36 preferably comprises a relay, connected in series in the main lines supplying power to the welding apparatus and to the caterpuller motor of the mill, and a timing device that delays energization of the relay for a short period of time in order to provide an opportunity for the tube speed to return to normal. The purpose of the mill stopping means is to protect the coil and impeder of the welding apparatus in the event a break occurs in the tube stock. The coil and impeder are subject to severe damage by the radio frequency energy applied to the coil when the metal of stock ceases to move therethrough.

As shown in FIG. 3, the mill stopping means 36 can be disabled by a switch 37 connected between 36 and the light-voltage detecting circuits of 34.

As in the case of the electrical power and forging pressure parameters, the speed of traveling tube product is monitored for the purpose of identifying product welded when the speed deviates beyond predetermined limits. More particularly, with a deviation in speed beyond arbitrarily chosen limits, as preset on the voltage level detecting circuits in 34, the voltage output from the pulse counting and integrating circuit is applied to the shift register, the shift register being energized to follow the tube sections welded during speed deviations periods. When the sections reach the shear mechanism, the gate means 20 is operated, as explained above, to divert such welded tube to a location separate from that of the satisfactory tube.

Figure 5:
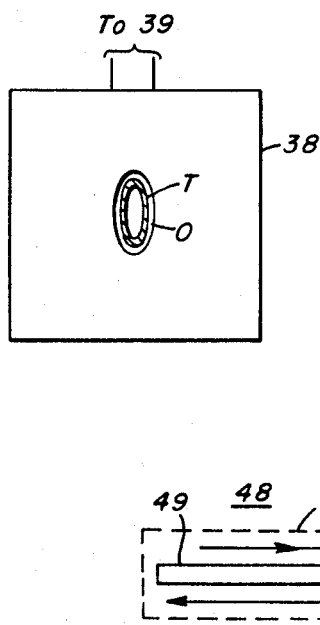
FIG. 5 is a diagrammatic view of a preferred coil structure for an eddy current test unit employed in the invention.

A fourth parameter measured and monitored in accordance with the invention is the continuity and quality of the weld seam. This is accomplished by continuously inducing eddy currents in the tube T as it travels from the welding station to the location of the shear mechanism. The eddy currents are induced and sensed in the traveling tube preferably by a coil structure 38 (FIG. 5) encircling the tube, which tube may be formed into any desirable cross sectional contour or configuration before it reaches the eddy current coil. In FIG. 5, the tube (in cross section) is shown formed into a somewhat oval shape from the original circular shape of FIGS. 1 and 2.

The coil structure 38 is preferably contoured to correspond to the configuration of the tube as indicated diagrammatically in FIG. 5 by the oval shaped opening O in the coil 38. The coil further preferably produces two adjacent bands of magnetic fields which induce two corresponding bands of eddy currents in the tube with uniform proximity to the tube by virtue of the coil contour. The two portions of the coil providing the two bands of eddy currents are further part of a balanced bridge circuit of a test unit 39 which becomes unbalanced when a defect in the weld seam (or in other portions of the tube) passes through a coil. The unbalanced bridge provides a signal for the shift register 16 which follows the tubing with the questionable weld in the manner described above in connection with the electrical, pressure and speed parameters. The uniform proximity of the coil to the tube, as shown in FIG. 5, provides highly accurate test results since the currents induced in the tube wall are uniform.

As shown further in FIG. 3, the output from the eddy current unit 39 is further connected to a tube marking mechanism 40 which functions to mark the tubing that has produced a signal output from the unit in a manner similar to that described above in connection with the marker 18.

A fifth parameter that can be measured and monitored to further insure the integrity of the weld being made, though not necessary for purposes of present invention, is the position and intensity of the welding arc. It has been found that the longitudinal position and the intensity of the arc are themselves a measure of the electrical power and forging pressure parameters. For example, excessive pressure, as might be caused by a defective squeeze roll or rolls S, or by an oversize in the width of the strip of tube stock, causes the arc to move away from the squeeze rolls with a corresponding increase in the light intensity of the arc. With excessive radio frequency power being supplied to the welding coil C, the arc migrates toward the squeeze rolls with a corresponding increase in the brightness of the arc. A reduction in power or forging pressure causes the reverse of the above phenomena.

As represented in FIG. 3, a photocell 42, in combination with appropriate optics and circuitry 43, can be employed to monitor arc migration and intensity changes, and the resultant output from the photocell and circuits used to apply a voltage to the relay interface 14 through high and low voltage level detectors 44. The detector 44 is shown located in the detector bank 12 in FIG. 3.

As with the factors of welding power and the three load cells reading squeeze roll pressure, the amount of arc movement and the change in arc light intensity are arbitrarily limited to produce a weld seam of a high predetermined quality. Any deviation beyond these chosen limits operates in the manner described above in connection with power and pressure parameters to identify tubing for rejection purposes.

As explained earlier, welding apparatus employed to seam weld tubing in a tube mill usually includes an impeder element for concentrating the magnetic flux of the welding coil at the edges of the tube stock being welded. The impeder comprises a very small ferrite rod or stick usually housed in a non-magnetic, non-conductive shell. The temperature of the impeder is a critical factor in the production of a sound weld because the reluctance of the ferrite core, which directly affects the pattern of the magnetic field generated by the welding coil and thus the coupling of the welding energy to the edge of the tube stock, is a function of its temperature. Moreover, the ferrite rod is heated by eddy currents induced therein by the field of the welding coil, and if the rod is sufficiently overheated, the heat will destroy the rod.

Figure 4:
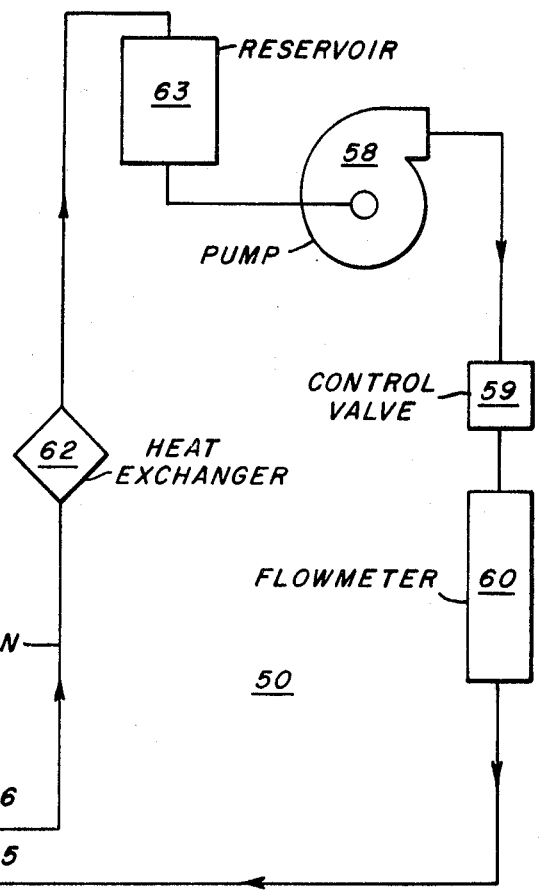
FIG. 4 is a circuit diagram of a cooling system employed to maintain the temperature of an impeder element at an optimum level.

In accordance with an embodiment of the invention, the temperature of an impeder, generally designated 48 in FIG. 4, and its small ferrite rod 49, are maintained at an optimum level by a cooling system 50 that continuously recirculates a coolant over the ferrite rod at a constant, controlled rate. In FIG. 4, the rod is housed in a non-magnetic, non-conductive shell 52 (indicated in dashed outline) which is provided with inlet and outlet connections diagrammatically indicated at 55 and 56.

The cooling system 50 includes further an adjustable flow pump 58, a flow meter 60, the shell 52, and a reservoir of coolant 63.

The system 50, as thus far described, allows a fixed coolant flow rate to be set and maintained, the flow rate being effective to maintain the impeder temperature at a level that provides optimum coupling efficiency between the welding coil and the tube stock. This is accomplished by watching the reading of the flow meter 60 while adjustment of the pump 58 is being made. The adjustment of the pump can be made by a control valve 59 which may be an integral part of the pump.

With the system 50 in operation, the coolant is directed from the reservoir 63 to the inlet 55 of the impeder shell 52 by the pump 58. In the shell, the coolant flows over the ferrite rod 49 to the outlet 56 of the shell for return to the reservoir. The flow of the coolant over the rod continuously removes heat from the rod at a constant rate because of the constant rate set for the coolant flow by the adjustment of valve 59.

Since the system, as shown in FIG. 4, is a closed system, heat must be removed therefrom in order to maintain the ferrite rod at an optimum operating temperature. For this reason, the system of FIG. 4 shows a separate heat exchanger 62 located between the impeder 48 and the reservoir 63. However, since the amount of heat required to be removed is not large, the reservoir itself can function as the heat exchange mechanism in the system.

Thus, in FIG. 4, a system is provided by which another critical welding parameter, namely, the temperature of an impeder element, is closely controlled to provide further assurance of a high quality weld seam in the finished product.

From the foregoing description it should now be apparent that a new and useful method of closely controlling and thereby assuring the quality of seam welded product has been disclosed. This is accomplished by measuring and monitoring basic and critical welding parameters in a welding mill, namely, the factors influencing the electrical power requirements of a welding arc, the squeeze roll pressures at which the edges of the product are forged together after being heated to a welding temperature by the arc, the speed of travel of the product through the mill, and the continuity of the weld as determined by eddy current measurements. These parameters are measured and monitored after they have been empirically determined to produce a consistently sound weld. With any deviation beyond predetermined limits, the quality of the product is questioned, identified and followed through the mill, and rejected.

While the invention has been described in terms of preferred embodiments, the claims appended hereto are intended to encompass all embodiments which fall within the spirit of the invention.

Having thus described our invention and certain embodiments thereof, we claim:

1. A method of controlling the quality of a continuously produced thin wall tubular product having a longitudinally extending weld seam, said seam being formed by an electrically produced welding arc generated across confronting edges of product stock at a welding station during relative movement between said stock and station, and as said edges are urged together in abutting relationship by at least three squeeze rolls circumferentially spaced around said tubular product at a single location downstream of said welding station, the method comprising the steps of selecting the levels of weld parameters required to produce a weld seam of a desired high quality for welding said product, said weld parameters consisting of the pressure at which each of the three squeeze rolls individually urge the confronting edges of the stock together, the speed of the relative movement of the stock, eddy currents induced in the welded product, and three electrical parameters consisting of the grid current of an oscillator tube employed in a power source supplying the power requirements of the welding arc, and the voltage and current of rectifiers employed in said source, choosing upper and lower limits of deviation for the selected levels of said weld parameters at which the welded product will be considered as defectively welded if at least one of the deviations is beyond said selected limits, continuously supplying the electrical power requirements of the welding arc and continuously measuring the above three electrical parameters, continuously urging the confronting edges of the said stock together and continuously and individually measuring the respective pressures at which the three squeeze rolls urge the edges of said stock together, measuring the speed of the relative movement of said stock, continuously inducing eddy currents in the welded product and continuously measuring said eddy currents, monitoring the position of said stock between the locations at which the above measuring steps are made and a location at which the product is cut into lengths of a predetermined length, identifying for rejection said predetermined lengths of the product welded when any of the measurements of said weld parameters obtained by the previous measuring steps deviate from the limits chosen therefor, and rejecting said predetermined lengths of product welded when the weld parameters deviate from the limits chosen therefor.

2. The method of claim 1 including the additional steps of continuously circulating a flow of coolant to and from a reservoir thereof over an impeder element located within the product stock and in the field of an induction coil at the welding station, and continuously controlling the flow rate of said coolant.

3. The method of claim 1 in which the step of inducing the eddy currents in the welded tubular product is effected by a coil structure having a cross sectional configuration corresponding to that of the welded product.

* * * * *

UNITED STATES PATENT OFFICE
CERTIFICATE OF CORRECTION

Patent No. 3,735,084                Dated May 22, 1973

Inventor(s) John M. Urbanic, D. Marshall Fox and Frederick C. Panian

It is certified that error appears in the above-identified patent and that said Letters Patent are hereby corrected as shown below:

Col. 1, line 53        Change "critically" to --criticality--.

Col. 1, line 53        Change "same" to --seam--.

Signed and sealed this 22nd day of January 1974.

(SEAL)
Attest:

EDWARD M. FLETCHER, JR.        RENE D. TEGTMEYER
Attesting Officer              Acting Commissioner of Patents